Figure 1:
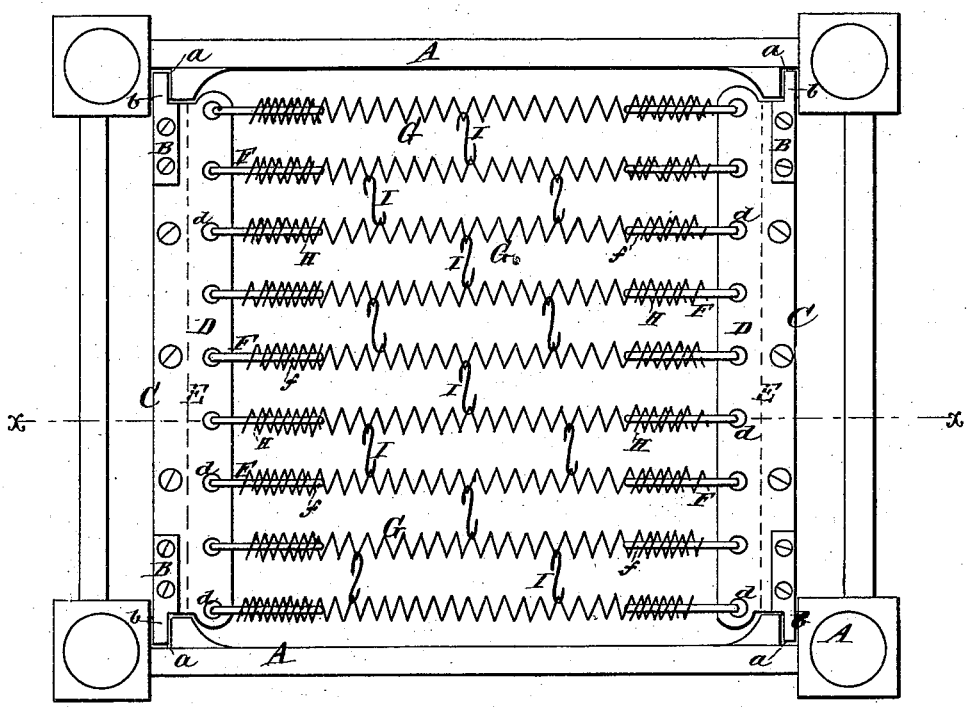

H. PITCHER.
Spring Bed-Bottom.

No. 208,987. Patented Oct. 15, 1878.

WITNESSES:
Henry N. Miller
C. Sedgwick

INVENTOR:
H. Pitcher
BY Munn & Co
ATTORNEYS.

UNITED STATES PATENT OFFICE.

HIRAM PITCHER, OF FOND DU LAC, WISCONSIN.

IMPROVEMENT IN SPRING BED-BOTTOMS.

Specification forming part of Letters Patent No. 208,987, dated October 15, 1878; application filed June 3, 1878.

*To all whom it may concern:*

Be it known that I, HIRAM PITCHER, of Fond du Lac, in the county of Fond du Lac and State of Wisconsin, have invented a new and Improved Spring Bed-Bottom, of which the following is a specification:

The object of my invention is to provide an improved device for attaching and supporting the ends of a spring bed-bottom, and for adjusting the tension of each separate spring.

The invention will first be described in connection with the drawing, and then pointed out in the claim.

Figure 2:
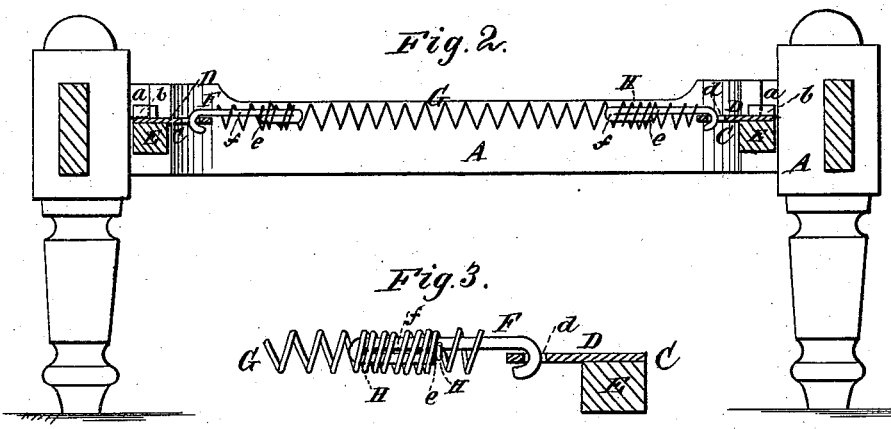
Figure 3:
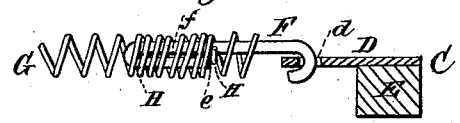

In the accompanying drawings, Figure 1 represents a plan view of my improved spring bed-bottom. Fig. 2 is a vertical section of the same, taken on the line $x$ $x$ of Fig. 1. Fig. 3 is an enlarged detail section on the line $x$ $x$ of Fig. 1.

Similar letters of reference indicate corresponding parts.

A is the bedstead, provided on opposite sides, at its end posts, with mortises $a$, to receive the metallic end tenons, $b$, of the cross-bars C, which latter serve as head and foot supports of the spring bed-bottom. The tenons $b$ are formed on the ends of metal plates B, which are fastened upon the ends of the cross-bars C. Each of the said cross-bars is composed of a plate or strip, D, of iron or other metal, and a wooden bar, E. The plate D is laid down flat upon and secured to the wooden bar E, and is sufficiently wider than the latter to leave room for punching through it a series of holes, $d$, for attaching to it the end hooks, F, of the spiral springs G, which latter together constitute the elastic surface of the bed-bottom.

A portion of the shank $f$ of each hook is bent back upon itself, the end forming a shoulder, $e$. The doubled shank $f$ is surrounded by a spiral wire, H, contracted at one end around the single portion of the shank, so as to lodge against the shoulder $e$, and thus be held by the latter from being pulled off of the hook F. The wire H thus forms a spiral or screw thread around the shank $f$, enabling the latter to be screwed into the end coils of one of the spiral springs G, more or less deep, according to length required of the said spring, or still deeper, if necessary to stretch the spring between its two end fastenings.

By this simple device the springs G are not only held firmly upon the shanks of the hooks F, but their tension may be adjusted to any degree of nicety desired.

To make the springs G act in unison, and thus form a uniform elastic surface, they are connected together by wire links I, in the usual manner.

Having thus described my invention, I claim as new and desire to secure by Letters Patent—

The hook F, having a portion of its shank $f$ turned back upon itself to form the shoulder or stop $e$, and surrounded by the spiral wire H, held by the said shoulder $e$, in combination with a spiral spring, G, of a spring bed-bottom, for holding and adjusting the tension of said spring, substantially as specified.

HIRAM PITCHER.

Witnesses:
G. L. BRASTED,
H. W. SPRAGUE.